Figure 1:
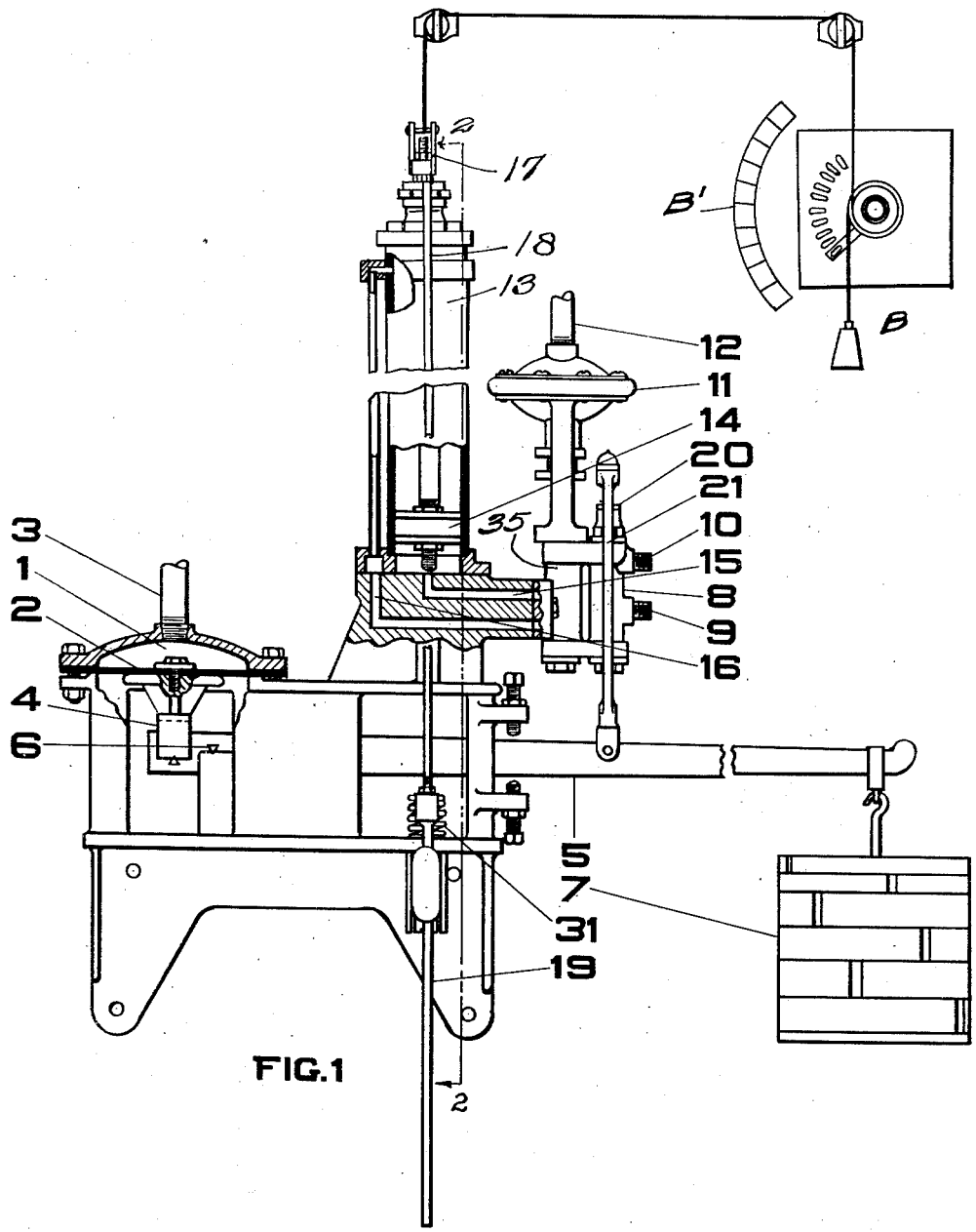

Aug. 24, 1926.

J. L. KIMBALL 1,597,202

REGULATOR

Filed March 7, 1921     3 Sheets-Sheet 1

INVENTOR.
James L. Kimball
BY
David Rines
ATTORNEY.

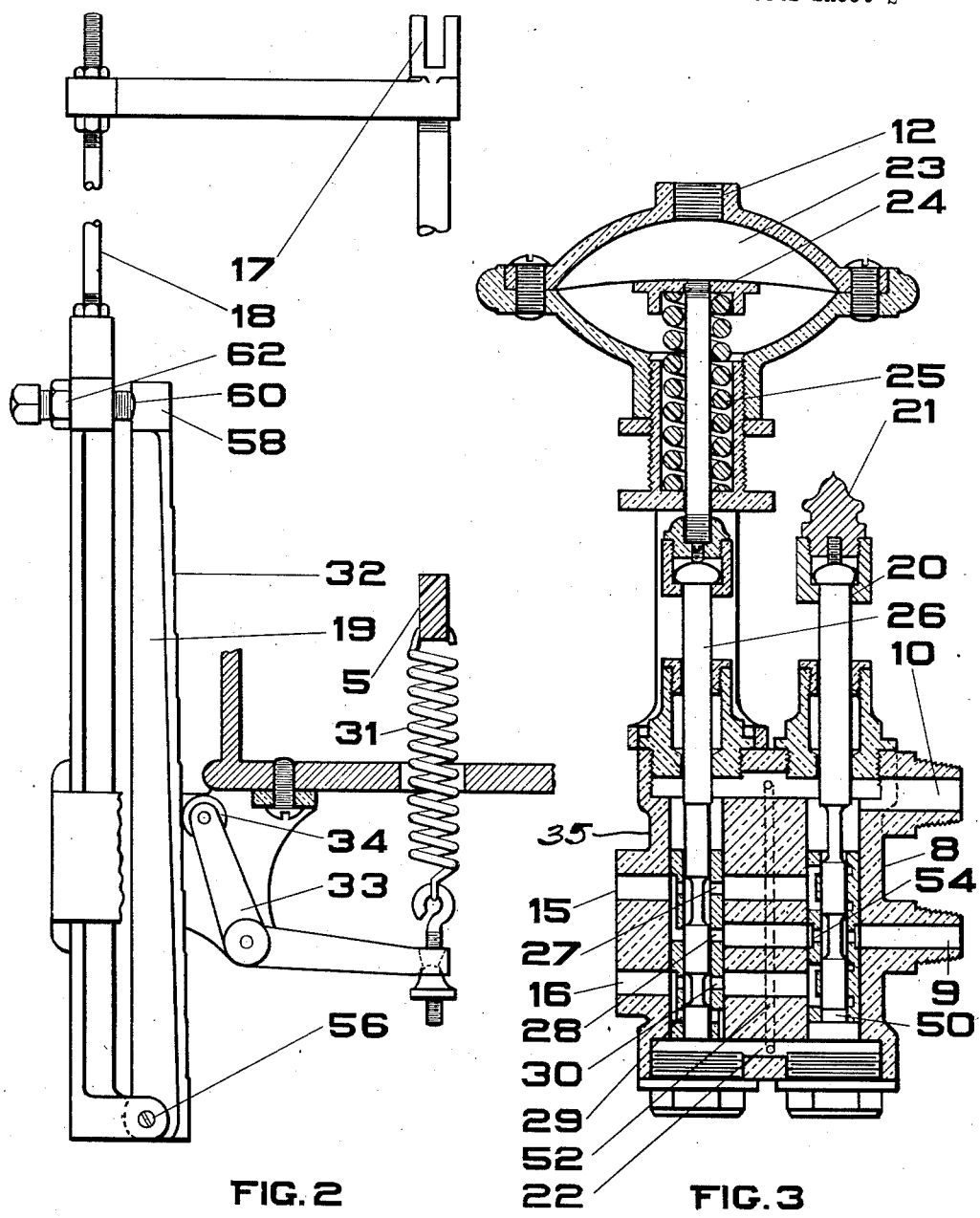

Patented Aug. 24, 1926.

1,597,202

UNITED STATES PATENT OFFICE.

JAMES L. KIMBALL, OF SALEM, MASSACHUSETTS, ASSIGNOR TO RUGGLES-KLINGEMANN MANUFACTURING COMPANY, OF SALEM, MASSACHUSETTS, A CORPORATION OF MASSACHUSETTS.

REGULATOR.

Application filed March 7, 1921. Serial No. 450,376.

The present invention relates to control systems, and more particularly to regulators for regulating the pressure of pressure systems.

Pressure systems are commonly automatically regulated through the agency of pressure devices having diaphragms that are responsive to variations in the pressure of the system. The diaphragm acts upon a scale beam that controls a valve for admitting fluid under pressure to one side or the other of a fluid-operated, damper-actuating motor, thereby automatically regulating the pressure of the system so as to maintain it within predetermined limits. When the regulator gets out of order, there is danger of the pressure in the system building up to an excessive, dangerous value.

An object of the present invention, therefore, is to provide an improved regulator of the above-described character with means for preventing the pressure in the system rising above a predetermined, safe value.

With this end in view, a feature of the invention contemplates providing an additional valve that is normally closed, but that is operable in conjunction with the first-named valve, in any position of the latter, to admit fluid pressure to that side of the motor which controls the closing of the damper.

Regulators of the above-described character have a tendency to hunt. Briefly stated, hunting action is a fluctuation of the pressure due to a supply in excess of the demand. An air supply in excess of the boiler load, by producing an excessive blowing period and, therefore, a corresponding idling period, neither of which represents the true load value, will cause hunting. The motor and, therefore, the damper controlled thereby, are actuated to a position somewhat beyond that required by the value of the pressure that caused the motor actuation. The pressure is thus caused to build up to a value too far to one side of the normal. The regulator thereupon proceeds to operate in the opposite direction, but does not become checked until the pressure attains a value too far to the other side of the normal. To reduce this hunting effect, various compensating improvements have been introduced, among them a mechanism for gradually counteracting the force exerted by the diaphragm upon the scale beam. Sudden and too rapid response of the valve is thereby prevented, and the tendency to hunt is reduced. Hunting has not, however, been completely eliminated.

It is a further object of the present invention, therefore, to reduce to a minimum the above-described hunting tendency.

To the accomplishment of this second object, the counteracting force upon the diaphragm is exerted, not gradually or uniformly, but step by step, permitting free play for the regulator between steps, but suddenly checking any further action at the limiting points of the steps.

With the above and other objects in view, as will be clear to persons skilled in the art, the invention consists of the improved regulator a preferred embodiment of which is hereinafter described, illustrated in the accompanying drawings, and defined in the appended claims.

Figure 4:
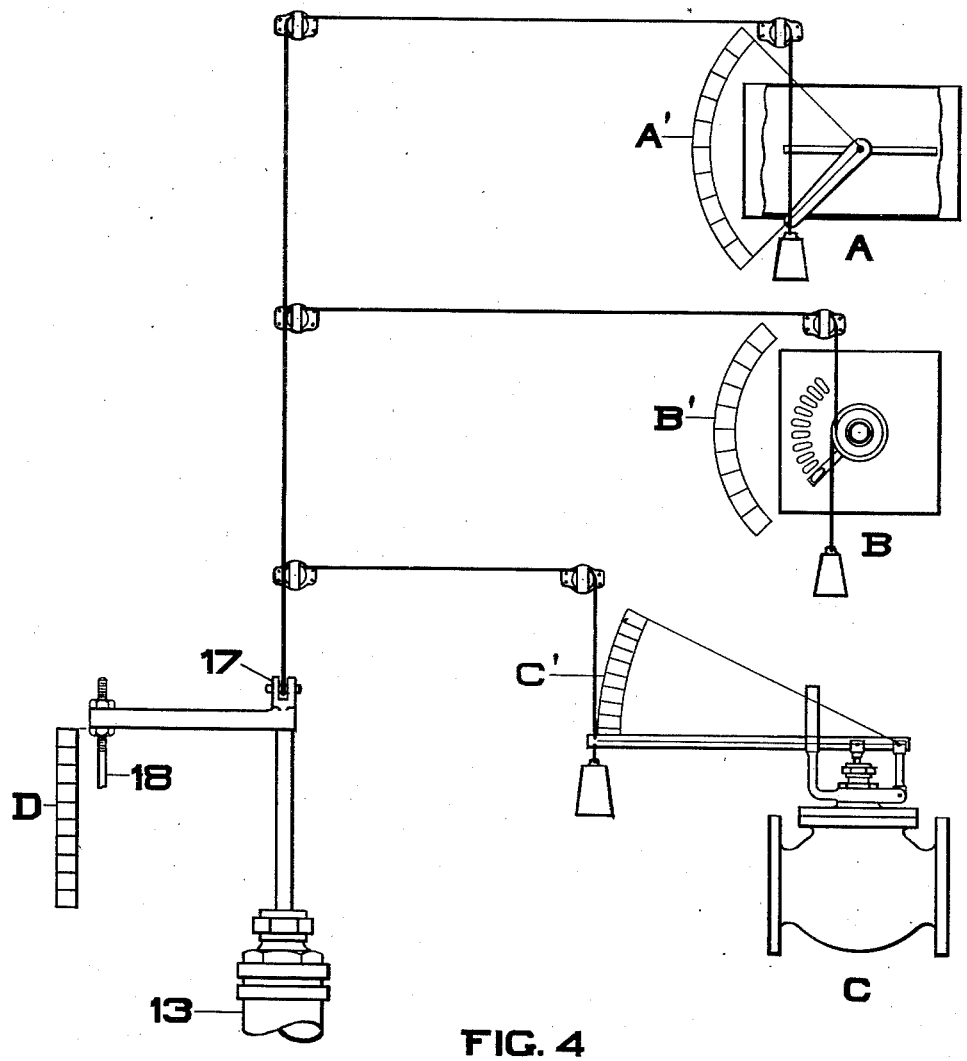

In the drawings, Fig. 1 is a diagrammatic elevation, partly in section, of a regulator constructed according to a preferred embodiment of the present invention; Fig. 2 is an enlarged section, taken substantially upon the line 2—2 of Fig. 1; looking in the direction of the arrows, an intermediate portion of the rod 18 being shown broken away; Fig. 3 is an enlarged vertical section of a preferred duplex pilot valve; and Fig. 4 is a diagrammatic view illustrative of various devices that may be controlled by the regulator of the present invention.

As above stated, the present invention relates more particularly to the control or regulation of fluid-pressure systems. The invention is illustrated, in its preferred form, as applied to the regulation of a steam-pressure system (not shown) that operates a steam-pressure device in accordance with the pressure obtaining in the steam-pressure system. The steam-pressure device comprises a pressure chamber 1 that is connected to the steam-pressure system by a steam pipe 3. The pressure chamber 1 contains a diaphragm 2. The diaphragm 2 is thus made responsive to the pressure in the system to operate, through a pressure cap 4, a scale beam 5. The scale beam is intermediately fulcrumed at 6, weights 7 at the other end of the scale beam exerting a force upon the scale beam in opposition to the force exerted by the diaphragm 2.

The movements of the scale beam 5 are communicated, through a connecting yoke 21, to a valve stem 20 of a pilot valve 8. The valve stem 20 is shown in Fig. 3 as occupying a neutral or ineffective position, in which the valve is closed. The valve stem is adapted to occupy also two effective positions, in one of which it is raised above, and in the other of which it is lowered below, the neutral position shown. When the valve stem becomes raised, upon the pressure in the system exceeding the normal value determined by the weights 7, the valve is adapted to admit water or other fluid under pressure from an independent pressure supply (not shown), through an inlet opening 9, by a port 27, and through a passage 15, to the under side of a fluid-operated motor, the cylinder of which is shown at 13 and the piston at 14. The motor piston 14 will thereupon be raised, the water above the piston exhausting through a passage 16 leading from the top of the cylinder 13, and through ports 30 and 50, to an exhaust chamber 22 that communicates, by a cored or drilled passage 52 in the side of the valve, with an exhaust opening 10. The movement of the motor piston 14 may, as shown in Fig. 4, be communicated, through the piston rod 17, to a flue damper A of a steam boiler to effect the closing of the damper to a greater or lesser degree; or to a rheostat B for controlling the speed of a motor-driven pump or fan, as shown in Fig. 1 as an example; or to a balance-lever valve C for controlling the steam pressure or the speed of a fan engine or a turbo blower, or for regulating the speed of a steam-driven pump. A partial or total closing of the damper will shut off, to a corresponding degree, the air supply to the steam-boiler furnace, which will result in correspondingly lowering the steam pressure. This lowering will continue until the pressure reaches a value below normal, whereupon the valve stem 20 will be moved by the diaphragm 2, through the scale beam 5, to its lower effective position, admitting water under pressure through the inlet opening 9, and by port 30 and passage 16, to the upper side of the piston 14. Water will, at the same time, exhaust by way of the passage 15, leading from the lower side of the piston 14, and by the port 27, to the exhaust opening 10. The consequent lowering of the piston 14 will be communicated to the damper to effect an increase in steam pressure. The valve stem 20 and the valve body 8 thus constitute two elements having a relative neutral position, as shown in Fig. 3, in which they are ineffective, and two relative effective positions in which they control the operation of the motor in opposite directions. The structure thus far described is old in the art, the piston 14 oscillating above and below a position corresponding to normal steam pressure and yielding the above-described hunting effect.

If the diaphragm 2 should become ruptured or otherwise disconnected from the pressure system, or if the pipe 3 should become broken or obstructed, and also under many other conditions, the valve stem 20 will be maintained in its lower effective position to cause the wide opening of the motor-controlled damper or valve. A dangerously high pressure may be built up as a result. An additional valve 35 safeguards against such a contingency. The additional valve 35 has a valve stem 26, under the control of a diaphragm 24 in a diaphragm chamber 23. The diaphragm chamber 23 is connected at 12 to the steam pressure system (not shown). When the pressure exceeds a predetermined, safe value, therefore, it will overcome the action of a spring 25, and force the valve stem 26 downwards. The normally open ports 27 and 30 will thereupon become closed, and the normally closed ports 28 and 29 will become opened. The normal flow of water under pressure from the inlet opening 9 through the valve 8 to the motor will become shut off at the ports 27 and 30. Irrespective of the position of the valve stem 20, however, and of the regulating means normally controlled thereby, water will flow through a port 54, the port 28 and the passage 15 to the under side of the motor cylinder, and will exhaust from the upper side of the cylinder by way of the passage 16 and port 29, to the exhaust chamber 22. The motor piston will thus be moved upward to effect the closing of the damper or valve controlled thereby and prevent any further increase of pressure until the diaphragm 2 is repaired or normal conditions are in some other manner restored.

It will be noted that the structure for effecting this result is very simple in character. The same source of pressure supply that controls the valve stem 20 controls also the valve stem 26, and the inlet and the exhaust openings and passages for the motor are the same during normal as during abnormal conditions. The only change involved is the closing of two normally open ports and the opening of two normally closed ports.

The preferred mechanism for reducing hunting to a minimum will now be described. Upon the rod 18, that is secured to the piston rod or plunger 17 so as to move up and down therewith, is mounted a vertically disposed wedge or cam member 19. The wedge 19 engages a roll 34 at one end of a pivoted bell-crank lever 33, the other end of which is connected by a spring 31 with the scale beam 5. As the motor piston rises, therefore, in response to the movement of the diaphragm 2, as communicated, through the scale beam 5, to the valve stem 20, the wedge 19 will cause the bell-crank lever 33 to impose an increasingly greater tension upon the spring 31. This, in turn, will impart an increasingly greater counteracting force upon the diaphragm 2, preventing sudden or too rapid movement of the valve stem 20 to its lower effective position and, therefore, preventing too rapid movement of the motor piston 14. A similar, but opposite, effect will be obtained on the downward movement of the piston 14 and of the wedge 19 that is movable therewith.

Hunting is prevented to some extent by the above-described structure, but there would still be a tendency for the valve stem 20, and the motor piston 14 controlled thereby, to be moved comparatively considerable distances beyond the positions corresponding to the attainment of normal pressure. The point of cut off, at which the pilot valve stem 20 is returned to its neutral position, would, furthermore, be somewhat indefinite, depending upon the friction of the pilot valve. The present invention, however, minimizes such tendency by providing for increasing the tension in the spring 31, not gradually, but abruptly, or step by step, by successive stages of travel that provide definite points of cut off. According to the preferred embodiment of the invention that is herein illustrated and described, this result is attained by forming a series of steps 32 upon the wedge 19. The valve stem is permitted free play to respond to variations in pressure upon the diaphragm 2 so long as the roll 34 engages any particular step, or is between adjoining stages of travel, but the roll 34 will engage the next succeeding step if the motor piston 14 continues to rise or fall, and this will result in variation of the counteracting force applied abruptly, through the spring 31, to the scale beam 5. The bell-crank lever 33 and the spring 31 are thus directly controlled by the wedge 19, so as to react upon the scale beam 5 and, through the latter, upon the valve stem 20 of the steam-pressure device. This reaction has the effect of changing the setting of the pressure device and, more particularly, of the pressure-responsive diaphragm 2, at each stepped position. Further operation of the motor piston 14 is thus prevented at each stepped position, for the valve stem 20 tends thus to be returned to its neutral position almost immediately upon its being displaced therefrom; and simultaneously with the stopping of the motor, the pressure setting is changed a predetermined amount to balance the change in pressure due to a change in the boiler load. No attempt is made to bring the pressure back to normal. If the pressure returns to normal, it is because the load returns to normal. The operation of the piston 14 of the pressure device is thus effected in abrupt steps, practically the entire compensating effect being applied at each stepped position, and very little between the stepped positions. Hunting action tends thus to be prevented.

Most fluctuations in steam pressure are of very small magnitude and do not indicate either a permanently rising or a permanently falling load. A large proportion of these negative changes, if permitted to remain undisturbed, would return to normal without regulation. According to the present invention, no attempt whatever is made to control such slight or negative fluctuations. The sudden changing of the pressure setting of the pressure-responsive device at each of the stepped positions in the operation of the motor causes abrupt cut-off at these positions. But it does more. It renders the regulator non-responsive at these cut-off positions to further variations in pressure until such variations attain further, comparatively large, predetermined values. As the regulator of the present invention is not responsive to such negative fluctuations, unnecessary changes in furnace conditions are avoided, and a fixed furnace condition is more nearly approached.

If the motor piston is rising, for example, an increased counteracting force will be applied to the scale beam at the time that the roll 34 engages a step 32. This will result in lowering the scale beam so as to tend to bring the valve stem 20 back to neutral position. This, in turn, has the immediate effect of partly or wholly shutting off the water-pressure supply through the inlet opening 9 to the motor and, by so much, checking the tendency of the motor to hunt. Usually, the motor will be brought completely to rest. If the pressure continues to vary in the same direction, that is, in the example above, to increase, the increased tension of the spring 31 will soon be overcome and the valve stem will again be moved in the same direction, that is, raised. The motor will then operate again in the same direction until the roll 34 reaches the next step 32. This process will continue, the motor, at each step, stopping to await a further variation in pressure before operating again, until the stroke of the piston has been completed. Similarly, when the pressure in the system decreases, the scale beam 5, and the valve stem 20 controlled thereby, will be lowered, admitting water under pressure above the piston 14 to force the piston downward. When the roll 34 reaches a step 32 on the downward movement of the stepped compensating wedge 19, the tension in the spring 31 will be somewhat released. The scale beam will thereupon rise to effect the closing of the valve. The motor cylinder 14 controlled thereby will be brought to rest. This process will continue until the downward stroke of the piston has been completed. The motor piston, in accordance with the operation of the diaphragm 2, will thus be brought to rest, or accentuated, at definite steps in its operation, corresponding closely to the load on the boiler; and a further variation in the pressure of the system must take place before the motor, and the damper controlled thereby, can be operated further. Whether the movement of the motor piston is up or down, the action of the stepped wedge 19 upon the scale beam, through the spring 31, is to retard the further movement of the piston. The hunting tendency is almost entirely eliminated in consequence of the intermittent varying force thus applied to the scale beam, and a degree of sensitiveness is attained that has not been possible of attainment heretofore. It has been found, in practice, that the flow through the valve is regulated in appreciably exact relation to the demand upon the system, and that the air supply to the furnace is not varied appreciably more than is absolutely necessary to compensate for variations in load conditions.

Maximum draft or air supply should be supplied at the load peak, but not before the peak is reached. A negative change in pressure with a fluctuating boiler load is equivalent to a positive change with a uniform load. The pressure-operating range, that is, the amount that the steam pressure may vary between minimum and maximum air supply to the boiler furnace, or the amount that it varies between minimum and maximum limits of travel of the regulator, must accordingly be wide enough to include the possible variations in load in order that the air supply may be consistent with the boiler load, and an excessive deficiency of the air supply may be avoided. Adjustable means are therefore provided for effecting a varying pressure-operating range between minimum and maximum air supply to the boiler furnace. In the specific embodiment of the invention that is herein illustrated and described, this result is attained by adjusting the angle or taper of the wedge 19. To this end, the wedge is pivoted at one end 56 and the other end 58 is adjustably engaged by a set screw 60 that may be locked in any desired position in any well-known manner, as by a check nut 62. By adjusting the screw 60, furthermore, it is possible to vary the pressure-operating range between minimum and maximum demands to meet various conditions of service. A change in pressure setting is thus effected that is equivalent to that effected at the stepped position plus that effected between stepped positions.

In further illustration of the principles underlying the present invention, let it be assumed, for concreteness, that the regulator is provided with ten non-responsive, regulating points. The wedge 19 is accordingly shown provided with ten steps 32, though the number may be more or less, as desired. Using ten steps, the motor plunger 17 will occupy the mid position of its stroke at the fifth step. At this time, the regulator should be balanced to the mean average pressure or boiler load. This may readily be arranged by manually adjusting the scale beam 5 by means of the counter weights 7.

Let it further be assumed, for definiteness, that the mean average pressure is 100 pounds, and that the operating range is five pounds above and below this average pressure. At a pressure of 101 pounds, therefore, the roll 34 is on the sixth step. The motor is caused to operate to adjust the pressure device to balance the load at 101 pounds. The motor does this adjusting automatically. A similar process takes place when the pressure is at 102 pounds, 103 pounds, and so on, up to 105 pounds, at which point there is no load to require air. At all times, the air is supplied in accordance with the load, and not in excess of the load. The boiler load or pressure is thus maintained or balanced at each predetermined value of the boiler load or pressure above or below the mean average setting. Within very narrow limits, the draft does not vary from this value.

A similar effect is obtained with a receding load. When the pressure drops to 99 pounds, the roll 34 is on the fourth step. The pressure thus tends to be maintained at 99 pounds, and there will be no further drop in pressure unless there is a further increase in the load.

At these definite cut-off points, the boiler load is balanced by the air supply and hunting action is, by so much, eliminated.

A novel regulator is thus provided operable step by step, in definite steps, and provided with means for changing the pressure setting at each stepped position, simultaneous with the return movement of the valve to neutral position.

Modifications may be made by persons skilled in the art without departing from the spirit of the invention, and such modifications are intended to be included within the scope of the invention, as defined in the appended claims.

What is claimed as new is:—

1. In a pressure system, means controlled by the pressure in the system for controlling the said pressure, and a valve operable in conjunction with the said means and irrespective of the operation of the said means to prevent further increase in the said pressure when the said pressure exceeds a predetermined value.

2. In a pressure system, a valve controlled in accordance with the pressure in the system for controlling said pressure, and a valve operable in conjunction with the first-named valve to prevent further increase in said pressure when said pressure exceeds a predetermined value.

3. In a pressure system, a valve for controlling the pressure in the system having a neutral position in which it is normally ineffective and two normally effective positions, means controlled in accordance with said pressure for moving the valve to its effective and ineffective positions, and a valve operable in conjunction with the first-named valve, in any position of the latter, to prevent further increase in said pressure when said pressure exceeds a predetermined value.

4. In a pressure system, a fluid motor for controlling the pressure in the system, a valve for controlling the motor having a neutral position in which it is normally ineffective and two normally effective positions for controlling the operation of the motor in one or another direction, means controlled in accordance with said pressure for moving the valve to its effective and ineffective positions, and means operable under predetermined conditions to effect the operation of the motor in one direction only, irrespective of the position of the valve.

5. The combination with a fluid motor comprising a cylinder having two passages connected thereto and a piston movable in the cylinder between the passages, and a valve operable to control the admission of fluid to the cylinder through either passage and the exhaust of fluid from the cylinder through the other passage, of a valve operable irrespective of the operation of the first-named valve to control the admission of fluid to the cylinder through one only of the passages and the exhaust of fluid from the cylinder through the other only of the passages, thereby to control the movement of the piston in one direction only.

6. In a pressure system, means controlled in accordance with the pressure in the system for controlling the said pressure, and a normally closed valve adapted to open when the said pressure exceeds a predetermined value, and operable, when open, in conjunction with the said means, to prevent further increase in the said pressure.

7. In a pressure system, a motor operable in two directions in which it controls an increase and a decrease, respectively, of the said pressure, means controlled in accordance with the pressure in the system for controlling the operation of the motor in both directions, and means operable when the said pressure exceeds a predetermined value to effect the operation of the motor in the direction in which it controls a decrease in the pressure of the system, thereby to prevent further increase in the said pressure when the said pressure exceeds the said predetermined value.

8. In a pressure system, means for controlling an increase and a decrease in the pressure of the system, and a valve operable in conjunction with the said means to prevent further increase in the said pressure when the said pressure exceeds a predetermined value.

9. A machine of the class described having, in combination, a pressure-responsive device, means controlled by the pressure-responsive device for controlling the pressure upon the pressure-responsive device. and a valve operable in conjunction with the first-named means for preventing a further increase in pressure upon the pressure-responsive device when the pressure upon the pressure-responsive device exceeds a predetermined value.

10. In a fluid system, a valve for controlling the fluid in the system having a neutral position in which it is normally ineffective and an effective position, means controlled in accordance with predetermined conditions in the system for moving the valve to the effective and to the ineffective positions, and a valve operable in conjunction with the first-named valve, in any position of the latter, to prevent a further change in the conditions of the fluid in the system under predetermined conditions.

11. In a system in which conditions in the system are controlled by a fluid, a valve controlled in accordance with predetermined conditions in the system for controlling the flow of the fluid, the valve having a position in which it controls the flow of fluid in one direction and a second position in which it controls the flow of fluid in a second direction, and a valve operable in conjunction with the first-named valve to cause the fluid to flow in the second direction under predetermined conditions irrespective of the position of the first-named valve.

12. In a draft-control regulator for boilers, a damper for controlling the draft, a motor for controlling the damper, two elements having a relative neutral position in which they are ineffective and a relative effective position in which they control the operation of the motor, a device responsive to variations in boiler load for relatively actuating the elements to the relative effective position, and means controlled by the motor for relatively returning the elements to the relative neutral position at predetermined points in the operation of the motor and for rendering the regulator non-responsive to predetermined changes in boiler load at each of the said predetermined points.

13. In a draft-control regulator for boilers, a damper, a fluid-pressure motor for actuating the damper, a pilot valve having a neutral position in which it is ineffective and two effective positions for controlling the operation of the motor in opposite directions, means responsive to variations in boiler load for actuating the pilot valve to the effective positions, and means controlled by the motor for returning the valve to the neutral position at predetermined points in the operation of the motor and for rendering the regulator non-responsive to predetermined changes in boiler load at each of the said predetermined points.

14. In a draft-control regulator for boilers, a damper for controlling the draft, a motor for controlling the draft-controlling means, two elements having a relative neutral position in which they are ineffective and a relative effective position in which they control the operation of the motor, a device responsive to variations in boiler load for relatively actuating the elements to the relative effective position, a stepped cam controlled by the motor for relatively returning the elements to the relative neutral position, and means for adjusting the device at each stepped position of the stepped cam to render the regulator non-responsive to predetermined changes in boiler load at each of the said stepped positions.

15. In a draft-control regulator for boilers, a damper for controlling the draft, a motor operable step by step to control the damper, two elements having a relative neutral position in which they are ineffective and a relative effective position in which they control the operation of the motor, a device responsive to variations in boiler load for relatively actuating the elements to the relative effective positions, and means controlled by the motor for relatively returning the elements to the relative neutral position at the stepped positions in the operation of the motor and for rendering the regulator non-responsive to predetermined changes in boiler load at each of the said stepped positions.

16. In a draft-control regulator for boilers, a damper for controlling the draft, a motor operable step by step for controlling the damper, two elements having a relative neutral position in which they are ineffective and a relative effective position in which they control the operation of the motor, a device responsive to variations in boiler load for relatively actuating the elements to the relative effective position, the device being adjusted to relatively actuate the elements normally at an average value of the boiler load, and means controlled by the motor for adjusting the device at the stepped positions in the operation of the motor by predetermined values of the boiler load above and below the said average value to relatively actuate the elements at the said predetermined values of the boiler load and for relatively returning the elements to the relative neutral position at the said stepped positions.

In testimony whereof, I have hereunto subscribed my name this 5th day of March, 1921.

JAMES L. KIMBALL.